E. B. BOGGS.
AXLE CLAMP.
APPLICATION FILED AUG. 16, 1909.

967,165.

Patented Aug. 16, 1910.

WITNESSES:
Elizabeth Doyle
A. Rager

Edward Brenton Boggs
INVENTOR.

BY
Geo. W. Rightmire
ATTORNEY.

UNITED STATES PATENT OFFICE.

EDWARD BRENTON BOGGS, OF COLUMBUS, OHIO, ASSIGNOR TO THE KILBOURNE AND JACOBS MANUFACTURING COMPANY, OF COLUMBUS, OHIO, A CORPORATION OF OHIO.

AXLE-CLAMP.

967,165.  Specification of Letters Patent.  Patented Aug. 16, 1910.

Application filed August 16, 1909. Serial No. 513,161.

*To all whom it may concern:*

Be it known that I, EDWARD BRENTON BOGGS, a citizen of the United States, residing at Columbus, in the county of Franklin and State of Ohio, have invented certain new and useful Improvements in Axle-Clamps, of which the following is a specification.

My invention relates to improvements in a clamp or clip for an axle, especially an axle used on a truck, and comprises especially a bearing mounted on the truck frame against which the axle bears on its upper face, and a clip or clamp mounted in the bearing to engage the axle on its lower face, a single bolt securing the clip firmly against the axle and also assisting in maintaining the bearing in place, by which construction the axle is held against rotation by means of the clamping without the use of holes and pins as is customary in such constructions. Further, the clamp forms a shoulder against which the hub of the wheel may act, whereby it is rendered unnecessary to upset the axle to form an end bearing for the hub of the wheel.

The features of this construction will be hereinafter particularly set forth, fewness of parts and simplicity being the primary features.

Figure 1:
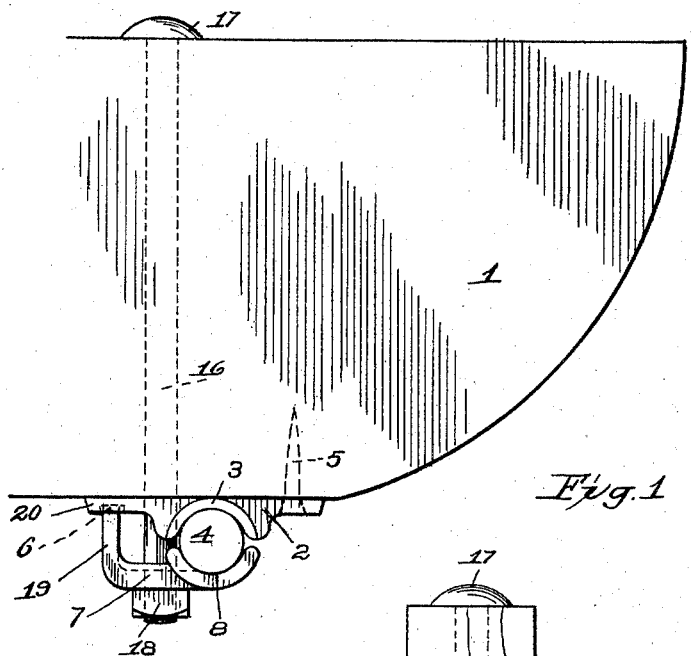
Figure 2:
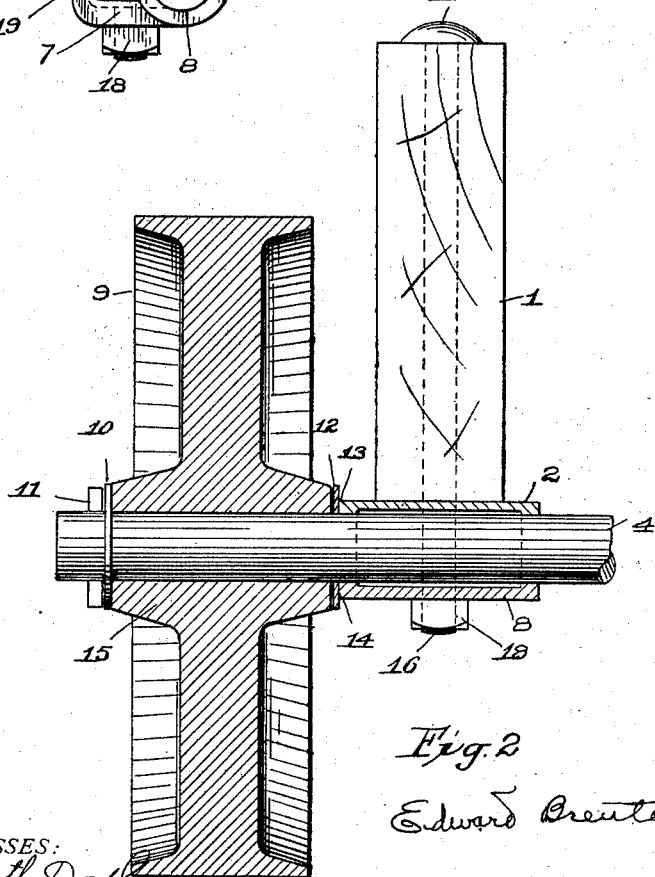

In the drawings which accompany this specification and form a part thereof, Figure 1 is a side view of the truck showing the clamping device secured in place thereon ready for operation; Fig. 2 is a vertical section through the wheel, bearing, and clamp, showing the manner of mounting the parts.

Referring to the drawings, 1 is a side frame of a truck or barrow having mounted on its under face the metal bearing plate 2 which is appropriately curved at 3 to receive the axle 4, which bearing is secured at one of its ends to the frame by the screw or nail or other fastening means shown at 5. The bearing plate 2 at its other end is not secured except by the bolt as hereinafter described. Detachably positioned on the bearing plate 2 at 6 to fix its location while the members are being assembled is the clamp or clip 7 which is formed with the circular recess 8 to receive the axle 4, so that when positioned, the axle bears on its upper face against the bearing plate 2 at 3 and on the lower face against the circular portion of the clamp 8. The axle is intended to be non-rotatable, and consequently the wheel 9 is mounted on the axle for rotation thereon; it is secured in place by the washer 10 held by the pin 11 against outward movement off of the axle, and on its inner side the washer 12 is provided against which the wheel 9 bears. The washer 12 is seen to bear against the bearing member or plate 2 at 13 and against the clamp 8 at 14, thereby rendering it unnecessary to upset the axle to form bearing shoulders for the hub 15 of the wheel 9, this function being performed as noted by the bearing plate and the clamp member. This permits the use of cold rolled steel for the axle in the condition in which it leaves the rolls, forging or upsetting being rendered unnecessary.

Bolt 16 passes through the side frame 1 from above, the head 17 being formed thereon to limit the downward movement of the bolt and at its lower end the bolt passes through the bearing plate 2 and the clamp member 7, and the nut 18 being turned into place as shown, the clamp is securely held against the axle, thereby forcing the latter into snug engagement with the bearing plate 2; the arm 19 of the clamp or clip member 7, under the compressing influence of the nut 18 serves to hold the end 20 of the bearing member 2 securely against the frame piece 1, so that the bolt performs the double function of holding the bearing plate securely against the frame of the truck and also holding the clip member against the axle so snugly that the latter can not rotate. Essentially, therefore, my invention consists in the use of a bearing plate, a detachable clip member, an axle mounted between the same and a bolt adapted to bind together the parts and also to bind the same upon the frame in such manner that the axle is held against rotation; at the same time a bearing shoulder for the hub of the wheel is provided by the clip and bearing members, thereby obviating the upsetting of the axle, and also obviating the necessity of boring the axle for the reception of a pin to prevent rotation thereof.

What I claim is:

1. In a truck, a frame, a bearing member mounted thereon and secured at one side thereof, a clip member detachably positioned upon the opposite side of said bearing member, an axle positioned between said bearing member and said clip member, and a bolt inserted through said frame engaging said members to securely position the same upon the frame and also through pressure exerted upon said clip member to prevent rotation of the axle.

2. In a truck, a frame, a bearing member mounted thereon, a clip member mounted on said bearing member, an axle positioned between said members, a bolt for securing said members upon the frame and binding them against the axle to prevent rotation thereof, a wheel rotatably mounted on said axle and having a hub bearing on its inner side against said members.

3. In a truck, a frame, a bearing member mounted thereon, a clip member, an arm thereon detachably engaging said bearing member, an axle positioned between said members, and means for causing said arm to exert pressure upon said bearing member and to grip said axle between said members to prevent rotation thereof.

In testimony whereof I affix my signature in the presence of two witnesses.

EDWARD BRENTON BOGGS.

Witnesses:
MILDRED GREBLE,
W. L. ESTES, Jr.